Patented Oct. 1, 1940

2,216,221

UNITED STATES PATENT OFFICE 2,216,221

CATALYTIC ISOMERIZATION OF NORMAL PARAFFINIC HYDROCARBONS

Jeffrey H. Bartlett, Cranford, N. J., assignor to Standard Oil Development Company, a corporation of Delaware No Drawing. Application September 16, 1939, Serial No. 295,251

13 Claims. (Cl. 260—676)

The present invention relates to an improved method for converting normal paraffin hydrocarbons into branched chain isomers. The invention will be fully understood from the following description.

The greater proportion of the lower boiling hydrocarbons contained in petroleum are straight chain or normal paraffins and it is desirable to convert the same into branched chain isomers which are superior in respect to antidetonation qualities and are likewise more reactive.

Aluminum chloride and other Friedel-Crafts catalysts, such as zinc chloride, aluminum bromide, ferric chloride and the like, are known to be catalysts for the conversion of normal paraffins into iso-paraffins but it has been shown that most, if not all of these catalysts, require an activator, in the absence of which they have little or no real value. Hydrogen chloride has been proposed as an activator for the catalyst, but it is undesirable because of its high acidity and corrosiveness. Water may be added for the same purpose since it hydrolyzes a small amount of the Friedel-Crafts agent and produces the acid in situ.

It has now been found that the halides of boron are excellent activating agents and that they may be used in the absence of water, and are considerably less corrosive than hydrogen halide. In the present process normal butane, normal pentane and other normal hydrocarbons, or mixtures of the same, may be converted into branched chain isomers with little or no decomposition. The reaction may be conducted in batch, for example in a bomb or autoclave, or continuously in either the vapor or liquid phase. The reaction progresses under widely varying temperatures, for example broadly from 50 to 550° F., but it is preferred to keep to lower temperatures. With normal butane a temperature of say 150 to 250° F. is the most effective; with normal pentane, a temperature from 30 to 150° F. may be used most effectively. At more elevated temperatures, there is some decomposition to produce hydrocarbons of lower boiling point but this may be prevented by using a lower temperature. The time of reaction is important and varies with the catalyst, the feed stock, degree of agitation and the like. Broadly, the reaction may be effected in a half to 30 hours at the preferred temperature of 30° to 250° F. which is the most favorable range for liquid phase operation. When using vapor phase conditions and temperatures are preferably higher and time shorter, for example, less than 1 minute or even 30 seconds. By adjusting the amount of catalyst and temperature conditions the time may be varied throughout the range given to give the degree of conversion desired.

As catalysts, the Friedel-Crafts agents such as aluminum chloride, aluminum bromide, zinc chloride and ferric chloride may be employed, either alone or modified with the alkali or alkaline earth metal halides such as sodium chloride, potassium bromide, calcium chloride, barium chloride, and the like. The catalyst may be employed in lump or powder form, or may be used on carriers such as alumina, aluminum metal, clay, asbestos, active carbon, silica, silica gel, pumice and the like.

As indicated above, the Friedel-Crafts catalysts in an unactivated condition are not very effective for the conversion of normal to iso paraffins and an activating agent should be provided. Among the boron halides suitable for this purpose, boron fluoride is the most effective. It may be added to the feed stock either continuously or from time to time and its effect as an activating agent is clearly manifest in the absence of water or hydrogen chloride, although of course it may be used in the presence of such materials. The amount of the activating agent varies considerably with the different catalysts and as little as 1% on the feed stock is very effective, but it is ordinarily employed in somewhat greater quantity, for example from 2 to 3%. The activating agent in this instance appears to combine with the catalyst to make a complex, and this complex may be produced separately, isolated and employed as the catalyst or, as indicated above, it may be produced in situ. In either instance, it appears to be equally effective.

When the reaction is conducted continuously the catalyst, that is the metallic halide or Friedel-Crafts agent, may be placed in the reaction zone and the feed, containing the activating agent such as boron fluoride, passed over it either in liquid or vapor phase. The product is then separated into the isomerized constituents and the unconverted portion, which may be recirculated to increase the yield desired.

The present process is quite effective in converting normal butane to iso-butane or normal pentane into iso-pentane, but it may also be employed to treat naphthas, especially virgin naphthas containing large amounts of normal paraffins. When converting naphtha, it is frequently desirable to treat only the fractions containing from 4 to 6 carbon atoms, and to blend the product obtained therefrom with the heavier naphtha constituents.

Example 1

In order to test the value of the present activated catalysts, normal pentane was employed and was treated for a period of 20 hours at a temperature of 75° F. The catalyst was aluminum chloride and in one instance was activated with hydrochloric acid and with boron fluoride. The data are given in the table below:

| Catalyst | Product | |
|---|---|---|
| | Percent butane | Percent iso-pentane |
| 10% AlCl₃ <3% BF₃ | 2 | 26 |
| 10% AlCl₃  2% HCl | 2 | 25 |

Example 2

Experiments similar to those given in the previous example were carried out with larger amounts of catalyst. As before, the time of reaction was 20 hours, temperature 75° F., and the feed stock normal pentane:

| | Percent butane | Percent iso-pentane |
|---|---|---|
| 50% AlCl₃ | 2 | 24 |
| 50% AlCl₃+2% H₂O | 2 | 32 |
| 50% AlCl₃+2% HCl | 2 | 42 |
| 50% AlCl₃+less than 3% BF₃ | 2 | 70 |

Example 3

A complex of AlCl₃—BF₃ was prepared as follows: 85 grams of AlCl₃ were dissolved in 1250 grams of ethyl chloride and 20 grams of BF₃ were then added, and the mixture maintained at 50° F. A gel-like mass then formed which was freed of solvent by heating under vacuum to give a yellow solid. Using 10% of this yellow solid at 80° F., for a period of 20 hours, 40% of iso-pentane and 12% of butane were produced from normal pentane. It will be observed that the yield herein was about equal to that obtained with 50% aluminum chloride and 2% hydrochloric acid in the previous example.

The present invention is not to be limited to any theory of the mechanism of the reaction or the particular catalyst, activator or the like, but only to the following claims in which it is desired to claim all novelty inherent in the invention.

I claim:

1. In a process for converting normal paraffins to iso-paraffins with a Friedel-Crafts catalyst, the improvement comprising the use of a halide of boron as a catalyst activator.

2. Process according to claim 1, in which boron fluoride is employed as the activator.

3. An improved process for isomerizing normal paraffin hydrocarbons, comprising subjecting the same to the action of an aluminum halide in the presence of boron fluoride as an activator at a temperature in the range from 50° to 550° F.

4. Process according to claim 3 in which the catalyst is aluminum chloride.

5. An improved process for isomerizing normal paraffin hydrocarbons, comprising subjecting the same to the action of a complex of a Friedel-Crafts catalyst and a metal halide of groups I and II together with a boron halide as an activator.

6. Process according to claim 5 in which the complex catalyst is sodium aluminum chloride and the activator is boron trifluoride.

7. An improved process for converting normal butane into iso-butane comprising subjecting the same while in liquid phase to the action of a catalyst comprising aluminum chloride in the presence of boron fluoride at a temperature between 150 and 250° F.

8. An improved process for converting normal pentane to iso-pentane comprising subjecting the same while in liquid phase to the action of a catalyst comprising aluminum chloride in the presence of boron fluoride as an activator at a temperature in the range from 30 to 150° F.

9. An improved process for converting normal to iso-hydrocarbons, comprising subjecting the same to the action of a pre-formed complex of a metallic Friedel-Crafts catalyst and boron fluoride.

10. Process according to claim 9 in which the complex is composed of aluminum chloride and boron fluoride.

11. Process for converting normal paraffins to isoparaffins, comprising subjecting the same while in vapor phase at 300 to 550° F. to action of a catalyst comprising aluminum chloride in presence of a boron halide.

12. Process for isomerizing normal butane to isobutane, comprising subjecting the normal butane while in vapor phase at 300 to 550° F. with aluminum chloride while in presence of boron fluoride.

13. Process for converting normal pentane to isopentane, comprising subjecting normal pentane to the action of aluminum chloride in presence of boron fluoride while in vapor phase and at temperatures of 300 to 550° F.

JEFFREY H. BARTLETT.